No. 733,685. PATENTED JULY 14, 1903.
O. A. THANS.
PIPE COUPLING.
APPLICATION FILED JUNE 2, 1902.
NO MODEL.
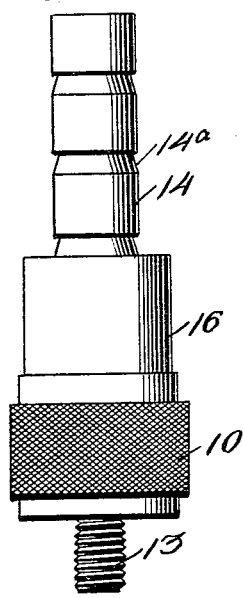
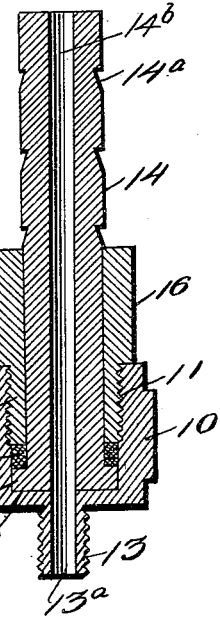
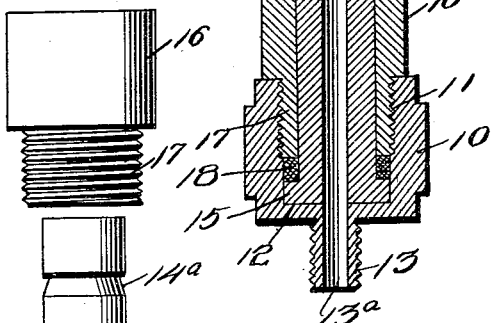
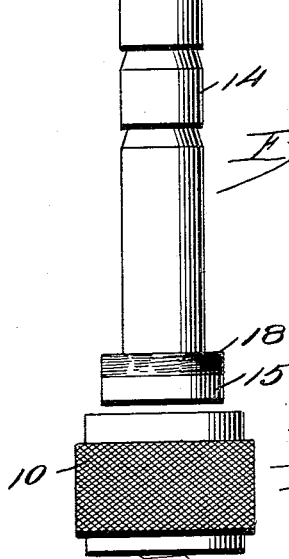
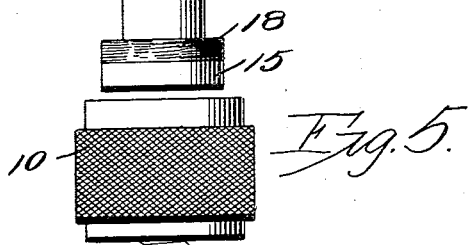
Otto A. Thans, Inventor.
Witnesses No. 733,685. Patented July 14, 1903.

UNITED STATES PATENT OFFICE.

OTTO ALBERT THANS, OF SPRINGFIELD, MASSACHUSETTS.

PIPE-COUPLING.

SPECIFICATION forming part of Letters Patent No. 733,685, dated July 14, 1903.

Application filed June 2, 1902. Serial No. 109,972. (No model.)

*To all whom it may concern:*

Be it known that I, OTTO ALBERT THANS, a citizen of the United States, residing at Springfield, in the county of Hampden and State of Massachusetts, have invented a new and useful Pipe-Coupling, of which the following is a specification.

This invention relates to devices employed for coupling a pipe detachably to another pipe or to any other body, but which will be employed more particularly in coupling the air-feeding tubes of bicycle-pumps to the nipples of the valves in the tires, to which purpose it is more particularly applicable.

One object of the invention is to produce a coupling more particularly applicable to the connection of small tubes or pipes, such as the pneumatic connections in bicycles, and which may be easily connected and disconnected and the valve readily and quickly assembled and dismembered for cleaning or repairs; and the invention consists in certain novel features of the construction, as hereinafter shown and described, and specified in the claim.

In the drawings illustrative of the invention, Figure 1 is a side view of the coupling complete. Fig. 2 is a vertical sectional elevation. Figs. 3, 4, and 5 are side elevations of the parts of the coupling disengaged.

In this invention is comprised a head or stop 10, having an internal screw-thread 11 in its upper part and a seat 12 in its lower part and with a screw-plug extending centrally from its lower part, the screw-plug being indicated at 13, and with a central aperture 13$^a$, leading into the interior of the head 10, as shown. Engaging the interior of the head 10 is a shank 14, having a flange 15 engaging the seat 12 and with its outer end provided with annular recesses 14$^a$, adapted to engage and retain the flexible hose in the ordinary manner. The shank 14 is provided with a central longitudinal aperture 14$^b$, registering with the aperture 13$^a$ and providing for the requisite continuous passage through the device. Engaging the shank 14 adjacent to the head 10 is a sleeve 16, the sleeve having a projecting screw-threaded extension 17 engaging the screw-threads 11, as shown. The sleeve 16 projects for a considerable distance upward upon the shank 14 above the head 10 and affords an extended lateral support thereto, which greatly increases the strength of the coupling and increases its efficiency by materially increasing the length of the bearing and correspondingly decreasing the tendency to "buckling" at the coupling. Between the lower end of the portion 17 and the flange 15 is a packing 18 of some suitable flexible material, such as rubber or leather, adapted to be compressed between the flange and the shank 14 and the head 10, as indicated in Fig. 2. By this simple means the hose engaging the shank 14 may be readily coupled to the part engaged by the stud 13, with the shank 14 left free to be revolved within the head 10, while at the same time fitting the head airtight by means of the packing 18.

It will noted that the shank 14 at no point above the sleeve 16 extends laterally beyond the sleeve, so that when the sleeve is detached from the head 10 the shank and sleeve are detachable one from the other, as indicated in Figs. 3 and 4, by which means all the parts are readily detachable for the purpose of cleaning or repairs. This is a very important feature of the invention and adds very materially to the efficiency of the device by providing for the easy accessibility of all the parts when required. By this simple means the whole device may be operated and applied with very little trouble, and its extreme simplicity renders it easy of manufacture and not liable to get out of order.

The screw-stud 13 is formed in one piece with the head 10 and is therefore very strong and not liable to become broken by the severe strains to which it will be subjected.

The sleeve 16, extending for a considerable distance longitudinally of the shank 14, affords a firm support thereto and prevents lateral strains from effecting it and causing the joint to open and is therefore also a very important feature of the invention, as above noted.

Having thus described my invention, what I claim is—

In a pipe-coupling, a head having an internal screw-thread in its upper part and an internal seat in its lower part, a screw-stud depending from said head and having a central aperture connecting with the interior of the head, a shank of uniform diameter throughout having a smooth external surface and provided with a laterally-extended flange engaging said seat and with a longitudinal aperture registering with the aperture in said stud, a sleeve having a smooth inner surface engaging said shank and extending upwardly therearound above said head and filling the space between the terminal of the head and the terminal of a pipe to be connected, thereby affording a lateral support for said shank, said sleeve having its lower end reduced and exteriorly screw-threaded to engage the threads in said head, a shoulder being formed thereby against which the terminal of said head abuts to form an air-tight joint, and a packing disposed between said reduced screw-threaded extension and said flange.

In testimony that I claim the foregoing as my own I have hereto affixed my signature in the presence of two witnesses.

OTTO ALBERT THANS.

Witnesses:
HARRY HARTLEY,
WILLIAM MCLAUGHLIN.